United States Patent [19]

Svetlik

[11] 4,383,966
[45] May 17, 1983

[54] METHOD AND APPARATUS FOR FORMING A FLANGE ON THERMOPLASTIC TUBING

[75] Inventor: Harvey E. Svetlik, Dallas, Tex.

[73] Assignee: Phillips Petroleum Company, Bartlesville, Okla.

[21] Appl. No.: 278,130

[22] Filed: Jun. 29, 1981

[51] Int. Cl.³ .................... B29C 17/00; B29D 23/00; B29C 1/12
[52] U.S. Cl. .................... 264/296; 264/320; 264/322; 264/DIG. 66; 425/393
[58] Field of Search ....... 264/322, 296, 320, DIG. 66; 425/393

[56] References Cited

U.S. PATENT DOCUMENTS

| | | | |
|---|---|---|---|
| 1,985,115 | 12/1934 | Straub | 25/155 |
| 3,445,552 | 5/1969 | Aungst et al. | 264/40 |
| 3,599,287 | 8/1971 | Buck | 18/19 TE |
| 3,843,300 | 10/1974 | McFarlane | 264/322 X |
| 3,899,565 | 8/1975 | de Putter et al. | 264/322 X |
| 3,929,960 | 12/1975 | Findlay et al. | 264/322 X |
| 4,065,243 | 12/1977 | Acda et al. | 264/322 X |
| 4,079,710 | 3/1978 | Baumgärtel | 264/322 X |
| 4,097,570 | 6/1978 | Dickson et al. | 264/296 |
| 4,140,739 | 2/1979 | Cotten | 264/138 |
| 4,150,087 | 4/1979 | de Putter et al. | 264/322 X |
| 4,156,710 | 5/1979 | Carroll et al. | 264/322 |
| 4,177,237 | 12/1979 | Ueno et al. | 264/296 |
| 4,207,283 | 6/1980 | French et al. | 264/322 |
| 4,316,870 | 2/1982 | Rowley | 264/296 |

FOREIGN PATENT DOCUMENTS

| | | | |
|---|---|---|---|
| 2855298 | 7/1979 | Fed. Rep. of Germany | 264/296 |
| 53-269 | 1/1978 | Japan | 264/322 |
| 53-27667 | 3/1978 | Japan | 264/322 |
| 785582 | of 0000 | South Africa . | |
| 444525 | 3/1936 | United Kingdom . | |
| 877735 | 9/1961 | United Kingdom . | |
| 1417728 | 12/1975 | United Kingdom . | |
| 420472 | 8/1974 | U.S.S.R. | 264/322 |
| 707811 | 1/1980 | U.S.S.R. | 425/393 |

Primary Examiner—Philip E. Anderson

[57] ABSTRACT

A flange can be formed on the end of a plastic pipe utilizing a die and mold which define a flange shaped mold cavity which expands under the pressure of compression plastic flow of pipe as the cavity is filled with a near molten end of the thermo-plastic pipe and the flange is being formed.

14 Claims, 7 Drawing Figures

METHOD AND APPARATUS FOR FORMING A FLANGE ON THERMOPLASTIC TUBING

The present invention relates to a tool for forming an end on a thermoplastic tube. In another aspect, the present invention relates to a method for forming an end on a thermoplastic tube.

Plastic conduit has been in common use for several years for conveying fluids at a relatively low pressure. The conduit is generally supplied to installers in sections, which can range in length from about one to several hundreds of feet. The sections are commonly joined together by butt-fusing, which forms a fluid tight seal at the joints suitable for relatively low pressure utilization. At times, however, it is desirable to join the plastic conduit with a dissimilar plastic or non-plastic conduit. In such cases, butt-fusing will not always yield a reliable seal. To solve this problem, it is common to butt-fuse a section of pipe having a flange at its end adjacent the joint between conduits constructed from dissimilar materials. A matching flange is formed on the pipe constructed from the dissimilar material and the flanges joined as is known to form a fluid tight seal.

Where large diameter plastic pipe is to be joined, for example, pipe having a diameter between about 2 and 48 inches, it would be highly desirable that the flange be strong and free from structural defects.

OBJECTS OF THE INVENTION

It is an object of invention to provide an apparatus for forming an end portion on a thermoplastic pipe.

It is another object of this invention to provide a method for forming an end portion on a thermoplastic pipe.

SUMMARY OF THE INVENTION

According to one aspect of the invention, an apparatus comprises a mold defining a borehole having shoulder therein, a first portion of the borehole having a first diameter and a second portion of the borehole having a second diameter; a die having a shoulder on its cylindrical exterior surface positioned in the mold, a first portion of the die having a third diameter and a second portion of the die having a fourth diameter, said die being longitudinally movable in the borehole from a first position in which at least a portion of the shoulder of the die is adjacent to at least a portion of the shoulder of the mold to a second position in which a generally tubular mold cavity is defined between the die and the mold, said cavity being at least partially defined between the shoulder in the borehole and the shoulder of the die; and means for biasing the die toward the first position.

According to another aspect of the present invention, an apparatus comprises a support member defined by a basewall having a central aperture therethrough and a skirt depending generally normally from the basewall about its exterior perimeter; and a die defined by a basewall having an exterior perimeter and a central aperture defined by an interior perimeter said central aperture being larger than the aperture through the support member and a skirt depending generally normally from the basewall adjacent its interior perimeter, the exterior perimeter of the basewall of the die being positioned inwardly from the skirt of the support member and in a close fit, and the skirt of the die being positioned on the side of the basewall of the die away from the aperture in the basewall of the support member.

According to another aspect of the present invention, a method is provided for forming an end portion of a thermoplastic pipe comprising positioning a first end of a thermoplastic pipe in a first generally tubular portion of a mold cavity formed between a die and a mold, said mold cavity having a closed end formed by a portion of the die, said first generally tubular portion of the mold cavity being dimensioned so as to closely fit the first end of the thermoplastic pipe; urging at least one of the first end of the thermoplastic pipe and the die portion forming the closed end of the cavity toward the other with sufficiently great a force to cause the first end of the pipe to become fluid; moving the portion of the die forming the end of the mold cavity to form a second generally tubular portion of the mold cavity connected to the first generally tubular portion of the mold cavity; and flowing the fluid first end of the pipe into the second generally tubular portion of the mold cavity as it is formed.

According to another aspect of the present invention, providing a thermoplastic pipe having a longitudinal axis, a first end and a second end, wherein a portion of the pipe adjacent the first end is at a molding temperature, and a portion of the pipe adjacent the second end is at a temperature below molding temperature and flowing at least a portion of the pipe generally radially outwardly and into a flange shaped cavity from between the pin and the collar.

When the method or apparatus of the invention are utilized to form flanges on plastic tubing, for example, polyethylene tubing, having a diameter of, for example, between about 4 and about 36 inches, a strong flange results which is well suited for its intended purpose. The flange is a totally integral part without internal seams or joints. Additionally, the juncture of the inside diameter of the pipe and the flange face can be provided with a square edge.

DETAILED DESCRIPTION OF THE INVENTION

Figure 1:
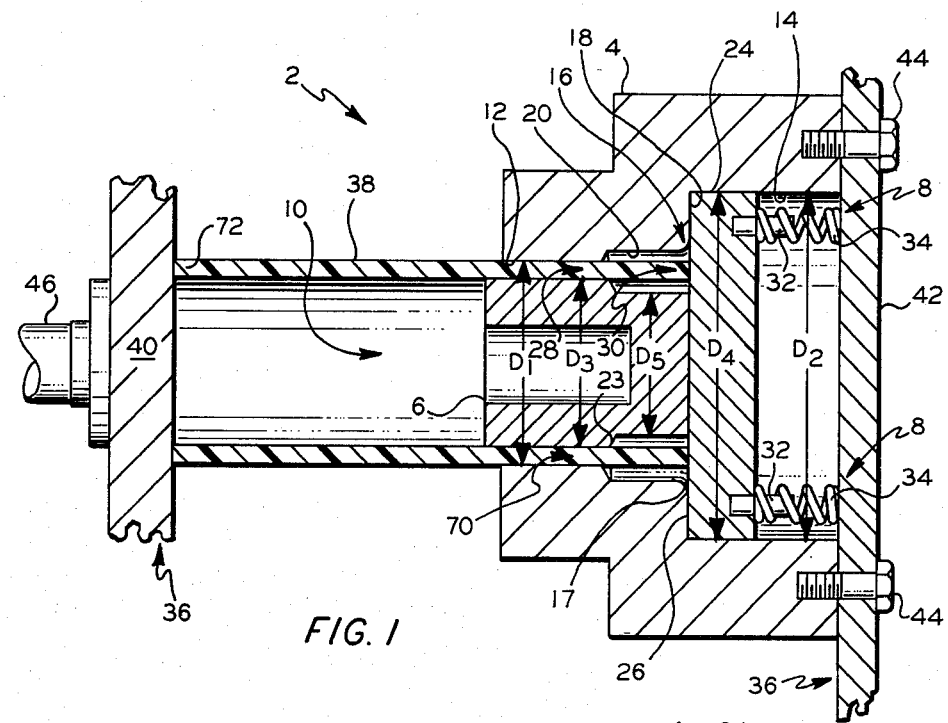
FIG. 1 is a fragmental cross section of an apparatus embodying certain features of the present invention.

With reference to FIGS. 1-4, an apparatus 2 comprises a mold 4, a die 6 movable from a first position to a second position longitudinally in the mold 4, and a biasing means 8 for biasing the die toward its first position. The parts are preferably formed from a durable, strong material, such as steel.

Generally, the mold 4 defines a borehole 10, which is preferably generally cylindrical in shape and has a first generally cylindrical portion 12 having a first diameter $D_1$, and a second generally cylindrical portion 14 having a second diameter $D_2$, $D_2$ being greater than $D_1$. A shoulder 16 separates the first portion of the borehole from the second portion. Although the borehole can abruptly expand at the shoulder 16, it is preferred that only a portion 18 of the shoulder 16 present a generally annular surface. It is further preferred that corners 17 of the mold be rounded. Another portion 20 of the shoulder 16 is preferably provided with a diameter intermediate that of the first portion and the second portion so as to provide a thickened section adequate for machining to finished dimensions along with the solid flange.

The die 6 is preferably generally cylindrical in shape, that is, having a generally circular cross-section, preferably having a first generally cylindrical portion 22 having a third diameter $D_3$ and a second preferably generally cylindrical portion 24 having a fourth diameter $D_4$. In the embodiment shown in FIGS. 1 and 2, the portion 22 is a part separate from the portion 24, while in the embodiment shown in FIGS. 3-5, the portion 22 is integral with the portion 24. A shoulder 26 is positioned between the first portion 22 and the second portion 24. Preferably, the shoulder 26 divides the portion 22 from the portion 24 and is generally annular in shape. The cylindrical portion 22 of the die is preferably hollowed out to save weight and expense. In the embodiment shown in FIGS. 1 and 2, the portion 22 of the die is provided with a taper 23 extending from the diameter $D_3$ to a smaller diameter $D_5$ between the diameter $D_3$ and the diameter $D_5$.

Figure 3:
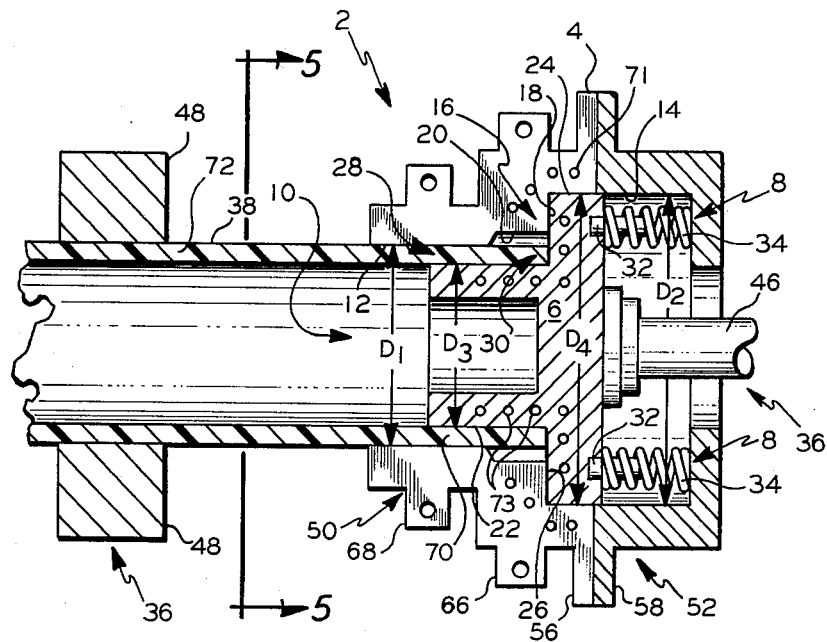
FIG. 3 is a fragmental cross section of a different apparatus embodying certain features of the present invention.

Generally, when the die 6 is in its first position, as seen in FIGS. 1 and 3, at least a portion of the shoulder 26 of the die 6 is adjacent to at least a portion of the shoulder 16 of the mold 4. The first generally cylindrical portion 22 of the die 6 is positioned radially inward from the first generally cylindrical interior surface portion 12 of the borehole 10. The third diameter $D_3$ is thus less than the first diameter $D_1$, preferably by an amount equal to slightly greater than twice the wall thickness of the tube to have its end formed. A generally tubular cavity is defined between the portion 22 of the die 6 and the portion 12 of the mold 4 which has an open end 28 and a closed end 30 which is closed by a generally annular portion of the shoulder 26 of the die.

The second generally cylindrical portion 24 of the die 6 is positioned radially inward and adjacent to the second generally cylindrical portion 14 of the borehole 10, preferably fitting the bore portion 14 as a piston.

Figure 2:
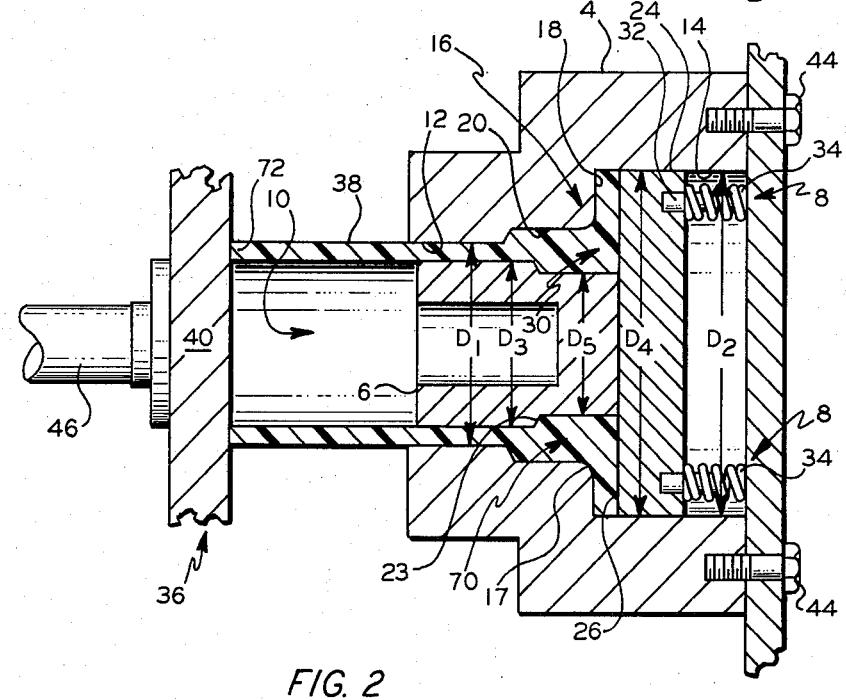
FIG. 2 is a fragmental cross section illustrating a changed relationship between certain of the features of the apparatus of FIG. 1.
Figure 4:
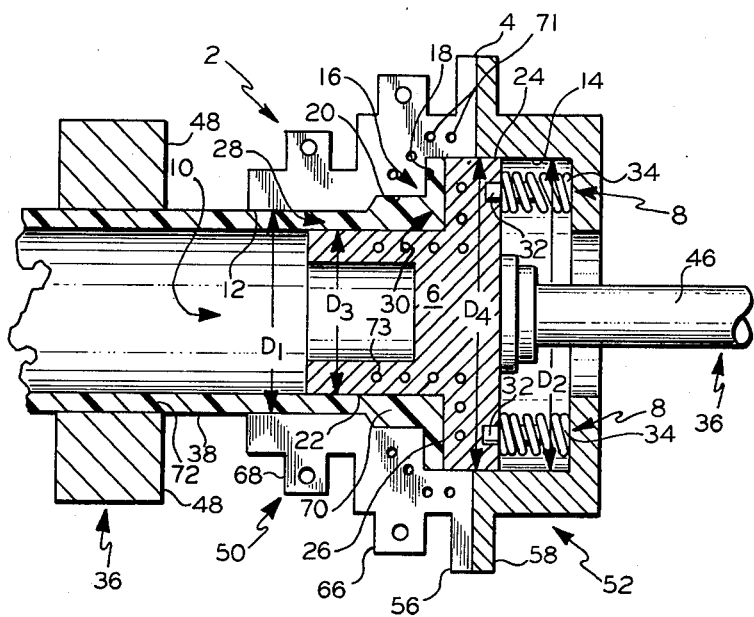
FIG. 4 is a fragmental cross section illustrating a changed relationship between certain of the features of the apparatus of FIG. 3.

The second position of the die 6, as best seen in FIGS. 2 and 4, can be adjusted as desired by manipulation of displacement limiting studs 32. Generally, the second position of the die will be spaced apart from the first position, with respect to the mold, at a distance of from about ½ to about 5, usually from about 1 to 3, preferably at about 2, wall thicknesses of the pipe to have its end formed. When the die 6 is in its second position, the first generally cylindrical portion 22 of the die 6 is positioned radially inward from at least the second generally cylindrical portion 14 of the borehole 10. Preferably, the generally cylindrical portion 22 of the die 6 is positioned radially inward from and spaced apart from the first portion 12, the shoulder 16 and the second portion 14 of the generally cylindrical borehole 10. A generally tubular cavity is formed between the mold 4 and the die 6 which is at least partially defined between the shoulder 16 of the mold and the shoulder 26 of the die, which have opened to a longitudinally spaced apart relationship. The mold cavity is closed at the end 30 by the shoulder 26 of the die 6 and is open at the end 28. The outside diameter of the end portion of the pipe, $D_2$, can be rather arbitrarily selected, but will usually be within the range of from about 1.05 $D_1$ to about 1.25 $D_1$. The inside diameter will usually be about $D_3$. Where the die has been provided with a taper 23, as in FIGS. 1 and 2, the inside diameter $D_3$ of the end portion will generally be within the range of from about 0.80 to about 0.99 $D_3$, usually from about 0.90 to about 0.98 $D_3$. After fabrication it is machined out to a diameter of about $D_3$. The closed end 30 of the cavity is preferably annular in shape, to facilitate providing the finished flange with good sealing capabilities.

Figure 6:
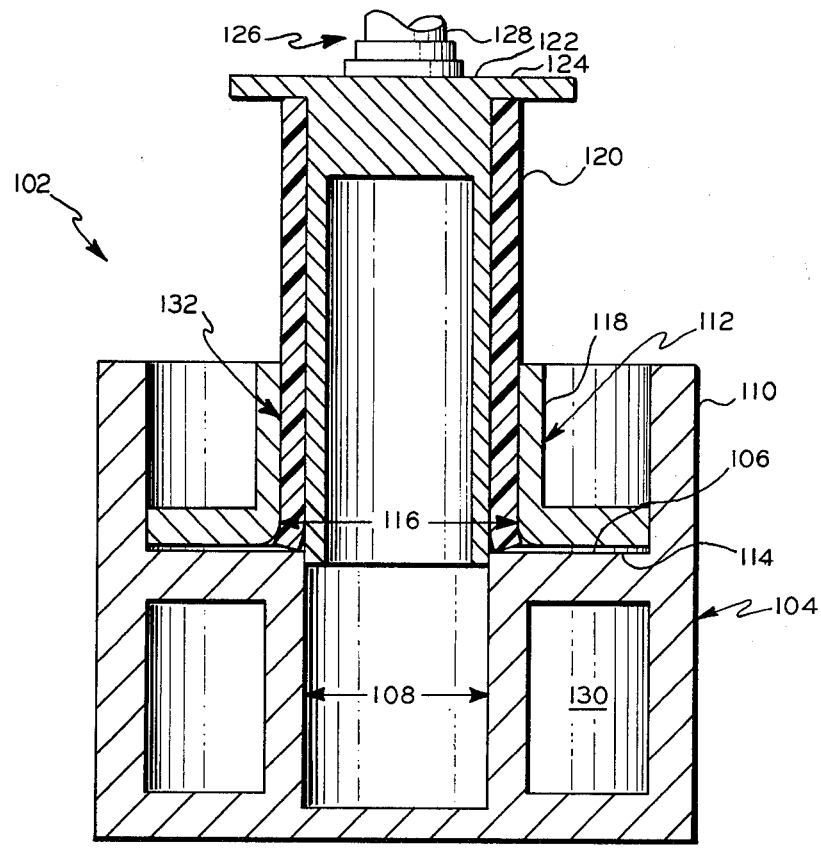
FIG. 6 is a fragmental cross section of a preferred apparatus embodying certain features of the present invention.
Figure 7:
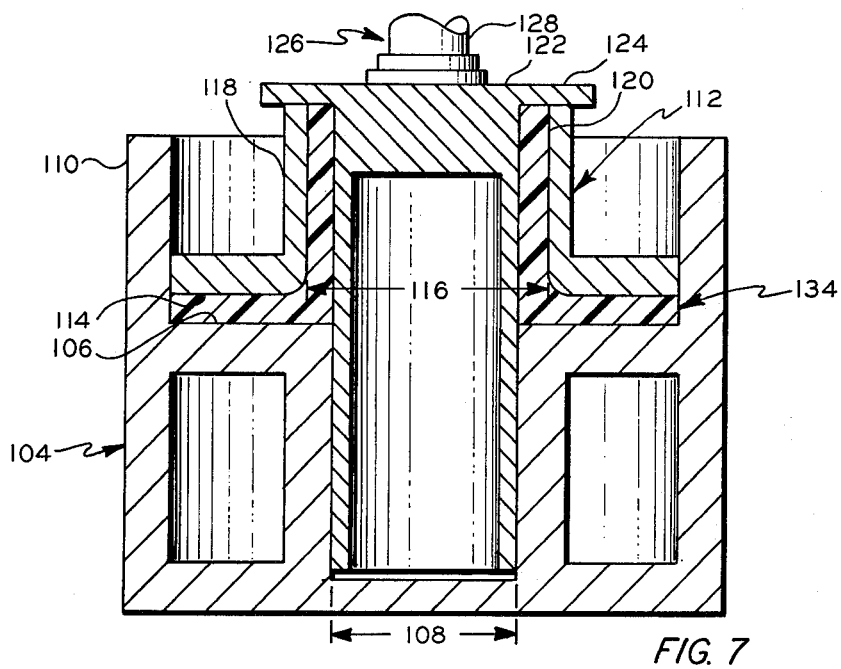
FIG. 7 is a fragmental cross section illustrating a changed relationship between certain of the features of the apparatus of FIG. 6.

In FIGS. 1-4, the biasing means 8 comprises at least one helical spring 34 which is associated with the die 6 so as to become compressed when the die is moved into the second position. In the embodiment of the invention as shown in FIGS. 6 and 7, the die is gravity biased.

When employed, the mold and die of the present invention is associated with a means 36 for causing relative movement between a tubular workpiece 38 having a first end 70 and a second end 72 with the first end 70 being positioned in the tubular cavity defined between the die 6 and the mold 4. In FIGS. 1 and 2, the means 36 comprises a first movable plate 40 and a second stationary plate 42 being urged together by a hydraulic press represented by shaft 46, for example acting against plate 40. The mold is longitudinally positioned between the plates, being fastened to plate 42, for example, by bolts 44. Plate 42 is preferably the working surface of a hydraulic press. Helical springs 34 press against plate 42. Plate 40 presses against the second end 72 of the workpiece 38.

Figure 5:
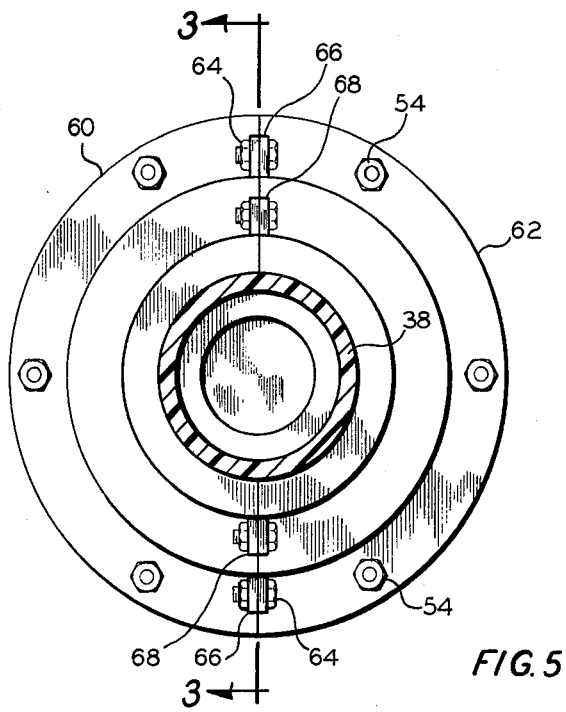
FIG. 5 is a left end view of the apparatus of FIG. 3 as taken along lines 5—5.

In FIGS. 3, 4, and 5, the means 36 comprises a hydraulic press represented by a shaft 46 which urges the die 6 and mold 4 toward a clamping means 48 which anchors the workpiece 38. In this embodiment, the mold 4 is divided into a forward portion 50 and a rearward portion 52. The forward and rearward portions are fastened together by bolts 54, for example, through flange portions 56 and 58. The forward portion 50 is divided into halves 60 and 62, as best seen in FIG. 5, which are fastened together by bolts 64, for example, extending through tabs 66 and 68.

The method of this invention is applicable to any size of plastic pipe. It is particularly applicable to large diameter pipe having a relatively thick wall, such as pipe having an inside diameter of at least 6 inches, for example, between about 12 and about 48 inches and a wall thickness of at least ¼ inch, for example, from about ½ inch to about 3 inches.

The polymer materials from which the pipes or pipe in sections are made are preferably polymers of ethylene or copolymers of ethylene and a small quantity of mono-1-olefin having 3 to 8 carbon atoms per molecule, i.e., up to about 10 weight percent. Such polymers and copolymers usually have a weight average molecular weight in the approximate range of 150,000 to 1,000,000, preferably from 250,000 to 500,000. It is presently preferred that the plastic pipe be formed from a copolymer of ethylene and a mono-1-olefin, containing at least about 90 weight percent of ethylene. In a presently preferred embodiment, the plastic pipe is formed from an ethylene/butene-1 copolymer formed from about 90 to 98 weight percent ethylene and from 2 to 10 weight percent butene-1.

First end 70 of the thermoplastic pipe 38 is positioned in the generally tubular cavity formed between the mold 4 and the die 6 when the die 6 is in the first position. At least one of the first end 70 of the pipe 38 and the annulus portion of the die 6 which defines the closed end 60 of the generally tubular cavity is urged toward the other with sufficiently great a force to cause the first end 70 of the pipe 38 to become fluid or plastic at some elevated temperature. As used here, the term fluid is intended to describe a flowable, or plastic phase of matter, between that of a malleable solid and a viscous fluid. The shoulder 26 of the die 6 moves away from the shoulder 16 of the mold 4 to form a generally tubular flange cavity portion of the mold which is at least partially defined between the shoulder 26 of the die 6 and the shoulder 16 of the mold 4. Causing expansion of the cavity can be facilitated by chamfering the end of the pipe before it is placed into the mold. The fluid first end 70 of the tubular workpiece 38 flows into the flange cavity defined between the shoulders 26 and 16 as it is formed. For use, the pipe is cooled and removed from the mold and die.

Generally, the shoulder 26 of the die 6 is resiliently urged against the shoulder 16 of the mold 4 by the biasing means 8. The pipe 38 and the die 6 are urged together with sufficiently great a force to overcome the resilient urging of the die 6 against the mold 4, thereby causing the die 6 to move with respect to the mold 4 and the generally tubular flange cavity to be formed between shoulders 16 and 26. Once the pipe has completely filled the mold cavity at its full expansion, it is subjected to a pressure generally of between about 500 and 1500 pounds per square inch (psi) usually between about 700 and 1000 psi.

It is preferred that the first end 70 of the pipe 38 be heated to an elevated temperature prior to or during the positioning of the first end 70 of the pipe 38 in the tubular cavity formed when the die 6 is in its first position. The required plasticity can be obtained by heating the pipe to a temperature substantially above ambient temperature preferably to a temperature above the heat set memory of the material from which the pipe is formed. Usually, where the pipe contains substantial amounts of polyethylene, it will be heated to a temperature of at least 250° F., and sometimes as high as 400° F. Due to the relatively thick wall of large diameter pipe, it is preferred that the pipe wall be heated on its inner and outer sides simultaneously. This can be accomplished by heating at least a portion of the pipe in a heated oil bath or a heated glycol bath. For convenience, an oil bath at an elevated temperature sufficiently high to cause the tube to become plastic but not so high so as to cause it to decompose can be employed. Preferably, the mold and die are also heated in the oil bath. Even more preferably, the mold and/or die are provided with means, such as channels, for heating and cooling the pipe to the desired temperatures. For example, passages 71 are provided in the mold and passages 73 in the die of the invention as shown in FIGS. 3 and 4, for flow of heat exchange medium. The pipe can thus be heated prior to or during its placement in the mold.

FIGS. 6 and 7 illustrate a preferred embodiment of the present invention. The apparatus 102 comprises a support member 104 and a die 112. The support member 104 comprises a basewall 106 with an aperture 108 therethrough and a skirt 110 depending generally normally from the basewall 106 about its exterior perimeter. The die 112 comprises a basewall 114 having a central aperture 116 therethrough and a skirt 118 depending generally normally from the basewall about its interior perimeter, defining the aperture. The aperture 116 is larger than the aperture 108. The die 112 is positioned at least partially in the support member 104 so that the exterior perimeter of the basewall 114 of the die 112 is positioned inwardly from the skirt 110 of the support member 104 in a close fit, preferably in a piston-cylinder arrangement. The die 112 is slidably movable from a first position in the support member 104, as shown by FIG. 6, to a second position, as shown by FIG. 7. The skirt 118 of the die 112 is positioned on the side of the basewall 114 of the die 112 which faces away from the aperture 108 through the basewall of the support member 104.

In use, a portion of a pipe 120 is positioned in a tubular volume defined between the skirt 118 of the die 112 and a pin 122. The pin is positioned radially inwardly from the skirt 118. A flange 124 is affixed to the pin 122. Preferably, the flange 124 is generally annular in shape and is affixed generally normally to the pin 122. The pin has a cross sectional shape and size so that it can be received closely by the aperture 108 through the basewall 106 of the support member. The flange 124 is positioned longitudinally spaced apart from the skirt 118 of the die 112 when the die 112 is in the first position and is oriented about normally with respect to the skirt 118 of the die. The flange 124 has a larger cross sectional dimension than the aperture 116. A means 126, such as hydraulic press represented by shaft 128 cooperates with the pin 122 to urge it longitudinally toward the aperture 108 and the flange 124 toward the skirt 118.

Preferably, the basewall 106 of the support member 104 is generally annular in shape, and extends generally radially inwardly from the skirt 110, which has a generally tubular shape. The basewall 106 at least partially defines a flow passage 130 for carrying heat exchange fluid, such as coolant fluid, such as water, into contact with the basewall 106. The basewall 114 of the die is preferably generally annular in shape and extends generally radially outwardly from the skirt 118, which is preferably generally tubularly shaped. The pin 122 is preferably generally tubular in construction, to save weight and expense, and the flange 124 affixed to the pin 122 is preferably generally annular in shape, for strength and ease of construction.

Operation of the invention of FIGS. 6 and 7 can be as follows. A portion 132 adjacent one end of the pipe 120 is heated to molding temperature, by means such as glycol bath. The heated end of the pipe is positioned between the skirt 118 which fits closely as a collar about the exterior of the pipe 120, and the pin 122, which closely fits the inside of the pipe 120. Preferably, the end of the pipe is flared before it is placed in the mold and the die 112 is placed overt is as a collar. At least a portion of the heated end of the pipe 120 is caused to flow longitudinally between the pin 122 and the skirt 118, for example, by force from the hydraulic ram acting against a second end of the via pipe flange 124. At least a portion of the pipe flows generally radially outwardly from between the pin 122 and collar 118 and into a flange shaped cavity 134. A fluid pressure build-up in the cavity 134 becomes sufficiently great to overcome frictional forces between the collar 118 and the pipe 120 and gravitational forces acting on the collar 118, and cavity 134 expands in a longitudinal direction as pipe flows thereinto and collar 118 is displaced upwardly toward the second end of the pipe. The pin 122 moves longitudinally past the cavity 134 and through aperture 108. The second position of the die 112 is determined by contact between the flange 124 and an upper end of the skirt 118. The longitudinal thickness of the flange to be formed on the pipe can thus be regulated by manipulating the longitudinal length of the skirt 118.

After contact between flange 124 and skirt 118, the material in the flange cavity is subjected to the desired pressure and then cooled by flow of coolant through passages 130, for example. Flange adaptors to be fastened to smooth tubing and having a flange at only one end can be removed from the apparatus 102 following withdrawal of the pin 122 and removal of die 112.

Reasonable modifications are possible within the scope of this disclosure without departing from the spirit and scope thereof. For example, the invention can be readily modified to form ends on tubing having other than a circular cross section, such as square or hexagonal tubing, and such modification is intended to be within the scope of this disclosure and appended claims.

What is claimed is:

1. A method for forming a flange on the end of a thermoplastic pipe, said method comprising
  (a) positioning a first end of a thermoplastic pipe in a first generally tubular portion of a mold cavity formed between a die and a mold, said mold cavity having a closed end formed by a portion of the die;
  (b) urging at least one of the first end of the thermoplastic pipe and the die portion forming the closed end of the cavity toward the other with sufficiently great a force to move the portion of the die forming the end of the mold cavity to form a second generally tubular portion of the mold cavity connected to the first generally tubular portion of the mold cavity; and
  (c) flowing the first end of the pipe into the second generally tubular portion of the mold cavity as it is formed.

2. A method as in claim 1 wherein
  (a) the die is resiliently urged toward the first tubular portion of the mold cavity; and
  (b) the force between the die portion closing the end of the mold cavity and the first end of the thermoplastic pipe is sufficiently great to overcome the resilient urging of the die against the mold, thereby causing the die to move away from the mold and the second generally tubular portion of the mold cavity to be formed between the die and the mold.

3. A method as in claim 2 further comprising heating the first end of the pipe to a sufficiently high temperature to cause it to become plastic but not sufficiently high to cause it to decompose prior to or during the positioning of the first end of the pipe in the first generally tubular portion of the mold cavity.

4. A method as in claim 3 further comprising pressurizing the first end of the pipe to a pressure of between about 500 and 1500 pounds per square inch after it has flowed into the second generally tubular portion of the mold cavity and then cooling the first end of the pipe.

5. A method for forming an end on a thermoplastic pipe comprising
  (a) providing a thermoplastic pipe having a longitudinal axis, a first end and a second end, wherein a portion of the pipe adjacent the first end at a molding temperature, and a portion of the pipe adjacent the second end is at a temperature below molding temperature;
  (b) positioning the heated end portion of the pipe between a collar which closely fits the outside of the pipe and a pin which closely fits the inside of the pipe;
  (c) flowing at least a portion of the heated end of the pipe longitudinally between the pin and the collar; and
  (d) flowing at least a portion of the pipe generally radially outwardly and into a flange shaped cavity from between the pin and the collar.

6. A method as in claim 5 wherein the flange shaped cavity expands in a longitudinal direction as the portion of the pipe flows thereinto.

7. A method as in claim 6 wherein the expanding flange-shaped cavity is at least partially defined by a portion of the collar, and the collar moves in a longitudinal direction toward the second end of the pipe as the cavity expands.

8. A method as in claim 7 wherein the pin moves in a longitudinal direction past the cavity as it expands.

9. Apparatus comprising
  (a) a mold defining a borehole having a shoulder therein, a first portion of said borehole having a first diameter and a second portion of said borehole having a second diameter,
  (b) a die having a shoulder on its exterior surface positioned in the mold, a first portion of the die having a third diameter and a second portion of the die having a fourth diameter, said die being longitudinally movable in the borehole from a first position in which at least a portion of the shoulder of the die is adjacent to at least a portion of the shoulder of the mold to a second position in which a generally tubular mold cavity is defined between the die and the mold, said cavity being at least partially defined between the shoulder in the borehole and the shoulder of the die;
  (c) at least one spring cooperating with the die so as to become compressed when the die is moved into the second position; and
  (d) a means associated with the at least one spring for limiting the second position of the die.

10. Apparatus as in claim 9 wherein
  (a) the mold defines a generally cylindrical borehole having a generally annular shoulder therin, and the borehole abruptly expands at the annular shoulder from a first diameter to a second diameter;
  (b) the die has a first generally cylindrical exterior surface spaced apart from the portion of the borehole having the first diameter, a second generally cylindrical exterior surface positioned adjacent the portion of the borehole having the second diameter, and a generally annular shoulder between the generally cylindrical exterior surface having the first diameter and the generally cylindrical exterior surface having the second diameter, the generally annular shoulder of the die being in juxtaposed relationship with the generally annular shoulder in the borehole; and
  (c) the at least one spring comprises at least one helical spring.

11. Apparatus as in claim 2 further comprising a means for causing relative closing movement between a tubular workpiece positioned in the generally tubular mold cavity and the mold.

12. Apparatus comprising:

(a) a support member defined by a support member basewall having a central aperture therethrough and a skirt depending generally normally from the support member basewall about the exterior perimeter of the support member basewall; and (b) a die defined by a die basewall having an exterior perimeter and a central aperture defined by an interior perimeter said central aperture being larger than the aperture through the support member and a skirt depending generally normally from the die basewall adjacent the interior perimeter of the die basewall, the exterior perimeter of the die basewall being positioned inwardly from the skirt of the support member and in a close fit, and the skirt of the die being positioned on the side of the die basewall away from the aperture in the support member basewall.

13. Apparatus as in claim 12 further comprising (a) a pin positioned inwardly from the skirt of the die having a flange affixed generally normally thereto, said pin having a cross section so as to be closely received by the aperture through the support member basewall and loosely received by the aperture through the die basewall, the flange on the pin being displaced from the skirt of the die, oriented about normally with respect to the skirt of the die, and having a cross sectional dimension through the pin larger than the dimension across the skirt of the die; and (b) a means cooperating with the pin urging the pin toward the aperture through the support member basewall and the flange toward the skirt of the die.

14. Apparatus as in claim 13 wherein (a) the support member has an annularly shaped basewall extending generally radially inwardly from a tubularly shaped skirt;

(b) the die has an annularly flange shaped basewall extending generally radially outwardly from a tubularly shaped skirt; and (c) the pin is tubular and the flange affixed to the pin is annular.

* * * * *